Figure 4:
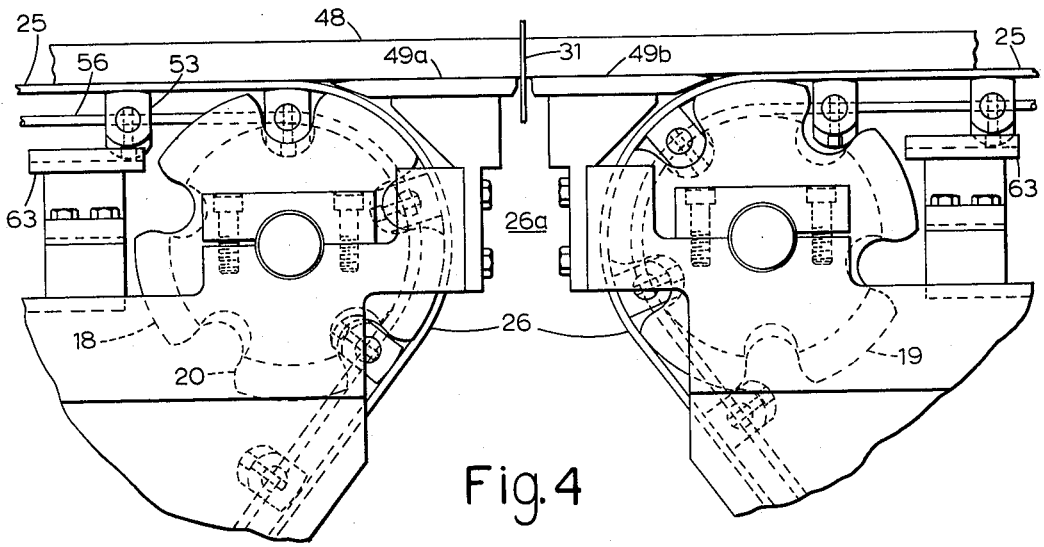

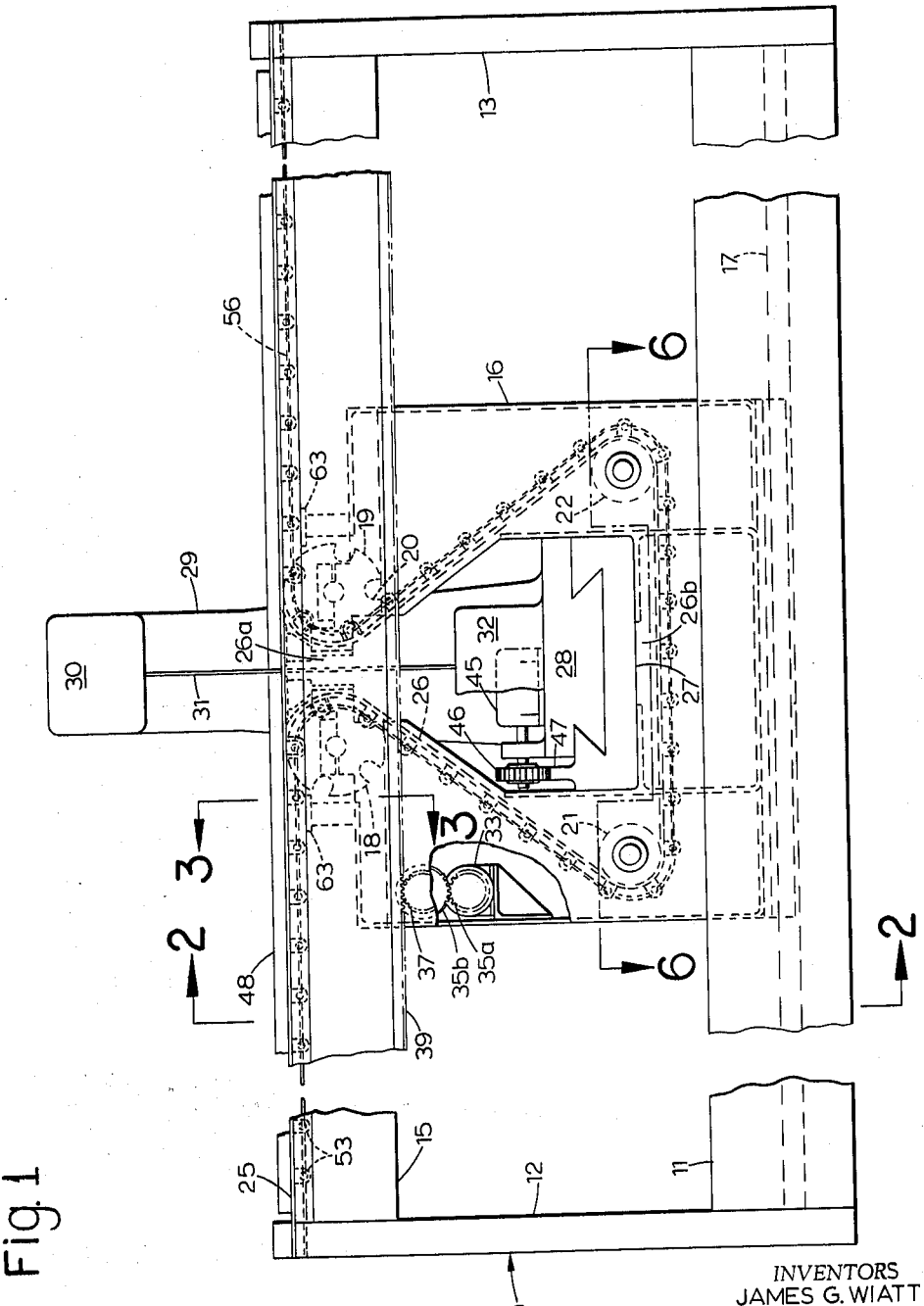

July 26, 1966    J. G. WIATT ETAL    3,262,348
TABLE WITH SUPPORTED FLEXIBLE TOP
Filed Jan. 29, 1965    4 Sheets-Sheet 2
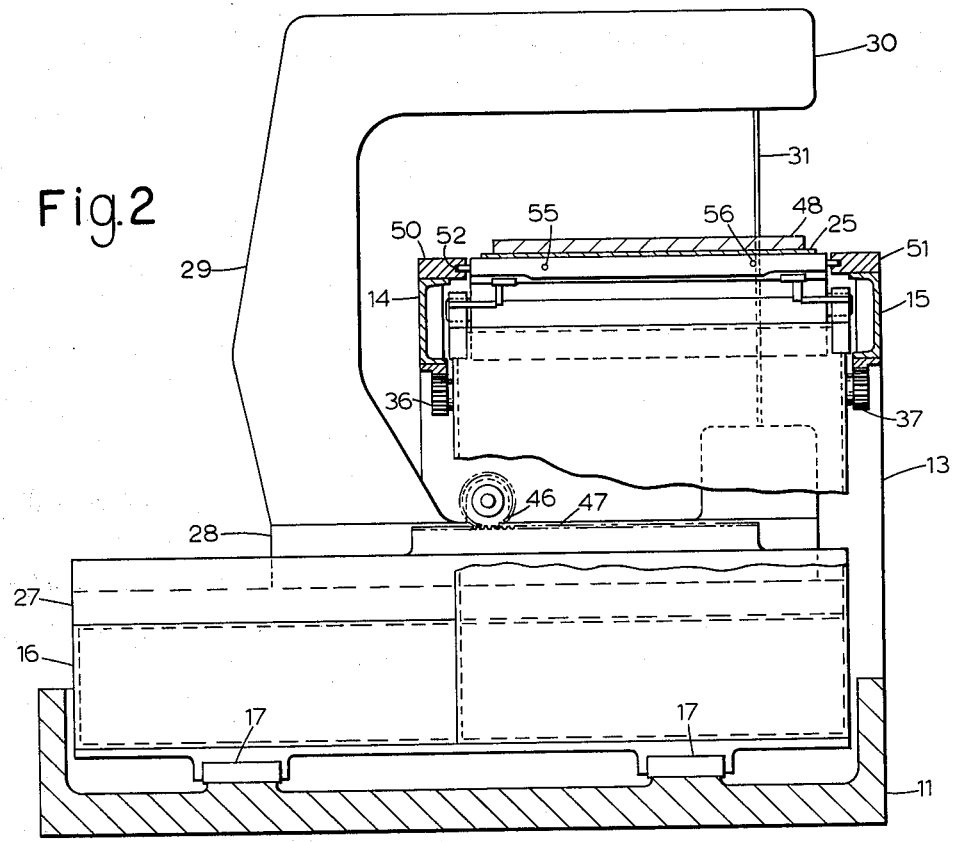
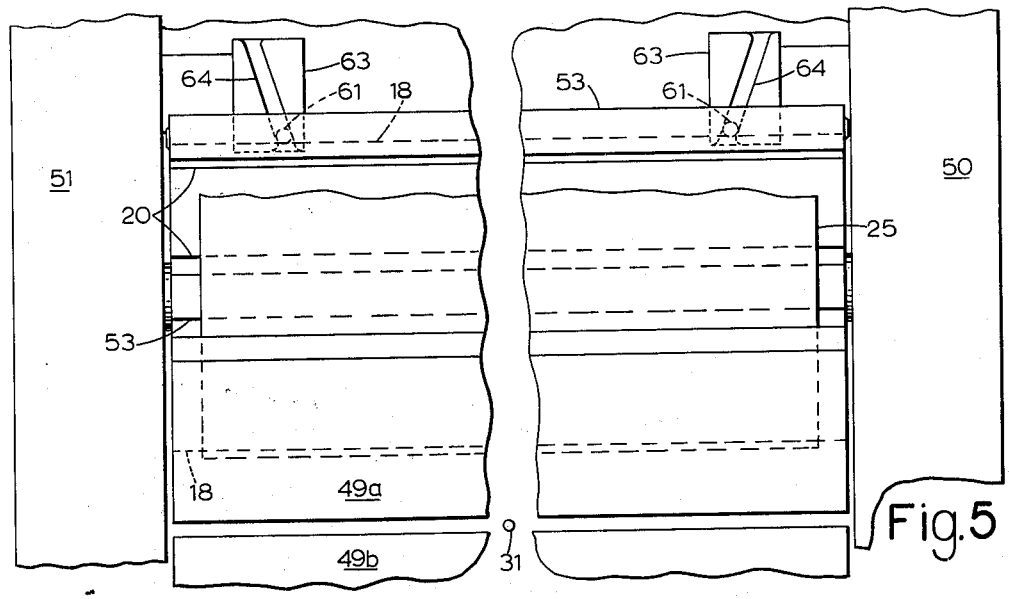

3,262,348
TABLE WITH SUPPORTED FLEXIBLE TOP
James G. Wiatt and Edward C. Bruns, Cincinnati, Ohio, assignors to The Cincinnati Milling Machine Co., Cincinnati, Ohio, a corporation of Ohio
Filed Jan. 29, 1965, Ser. No. 428,980
7 Claims. (Cl. 83—155)

The present invention relates to a table with a top made of a flexible band, or belt, and having a carriage for movement relative to the flexible band, which table is particularly suitable as the table in a machine for operating on work supported by the table.

In one type of machine table, a flexible band, or belt, which defines the table top, is threaded through spaced rollers in a carriage to define a loop in the band and produce an aperture in the table top at the carriage. The carriage can move along the band, which may be held fixed, and, during this movement, the aperture remains with the carriage. Work material supported by the flexible band table top spans the aperture in any position of the carriage. The machine has a cutting or forming tool mounted on the carriage which extends through the aperture for operation on the work material without interference with the table top. When the carriage moves relative to the work material (instead of the work material moving relative to the carriage), the table need be no longer than the length of the work material carried thereby.

A serious problem in mechanisms of this type is the support of the flexible table top, particularly if heavy loads must be supported thereby. Stationary rollers, or other supporting members commonly used to support conveyor belts, cannot be used because of interference with the carriage which moves longitudinally relative to the band.

In the present invention, firm, sturdy bars support the band on both sides of the carriage. These bars move from their supporting position as the carriage passes, and return to the support position after the carriage has passed. In the preferred form of the invention, the bars, which are linked together, extend between sturdy side support rails. The side rails straddle the band which is supported by the bars when the bars are in the support position. The string of bars is threaded through the carriage to follow the path of the flexible band through the carriage. As the carriage moves, each bar in the path of the carriage is successively automatically disengaged from the side rails so the string of rails can pass through the carriage. As the carriage passes, each bar is successively automatically engaged with the side rails to resume support of the flexible table top band.

It is therefore one object of the present invention to provide mechanism having a flexible band which is firmly supported without interference from a carriage moving along the band. It is another object of the present invention to provide mechanism having a flexible band threaded through a movable carriage in which each of the supports for the band is movable to and from a support position. It is yet another object of the present invention to provide mechanism having a flexible band threaded through a movable carriage which mechanism is capable of supporting heavy loads on the band. It is still another object of the present invention to provide a table having a flexible band defining a table top capable of supporting a heavy load of work material, in which the band is threaded through a movable carriage and in which the length of the table need be no longer than the work material carried thereby. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 3:
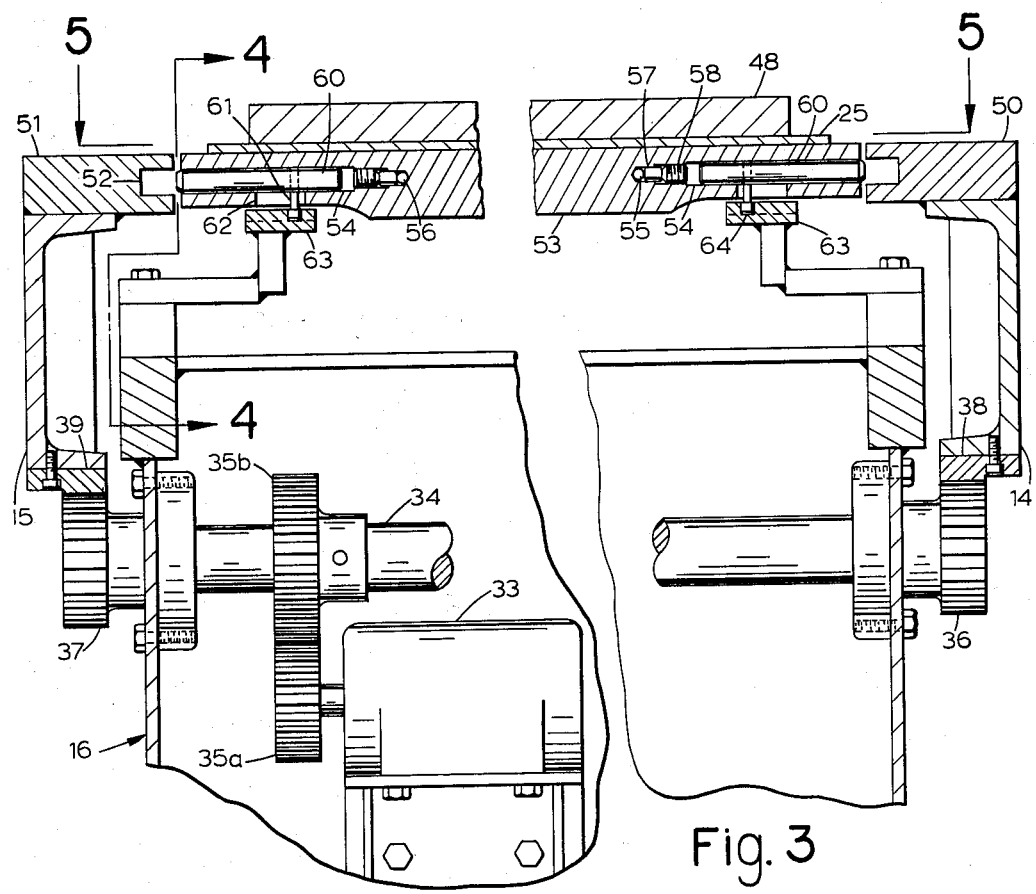

In the drawings:

FIG. 1 is a view in elevation of mechanism of the present invention;

FIGS. 2 and 3 are views taken on the lines 2—2 and 3—3 of FIG. 1;

FIGS. 4 and 5 are views taken on the lines 4—4 and 5—5 of FIG. 3; and

Figure 6:
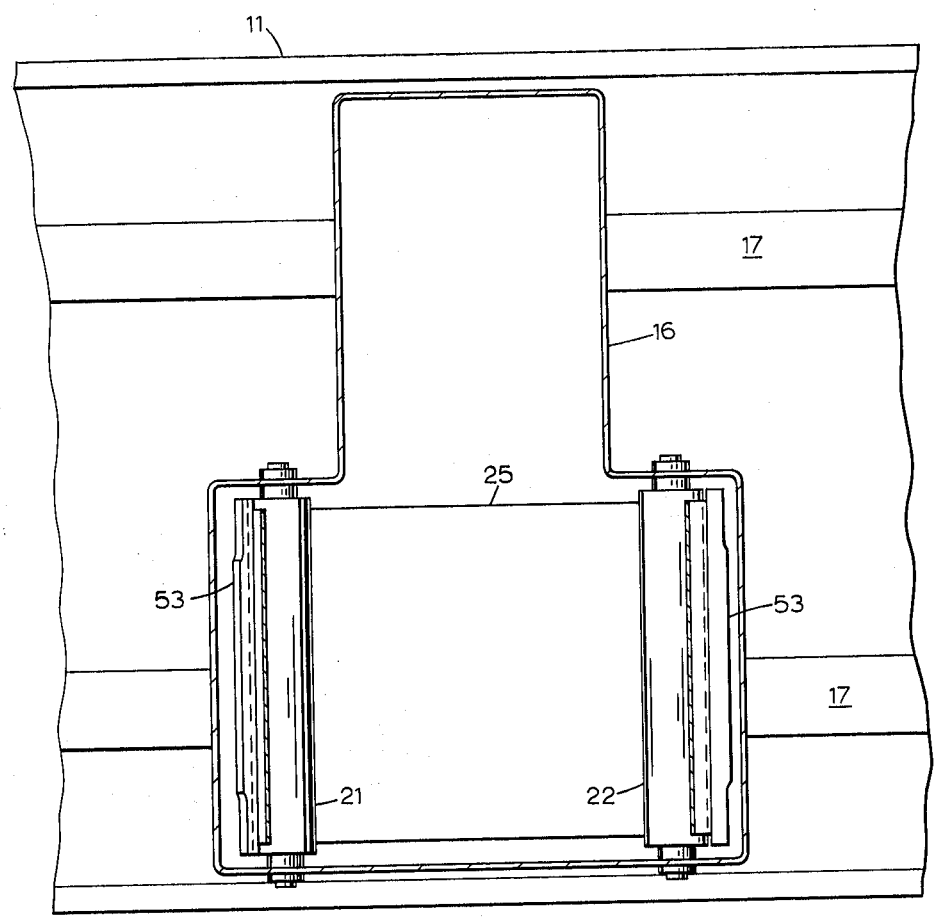

FIG. 6 is a view taken on the line 6—6 of FIG. 1.

The machine shown in the drawings to illustrate the present invention has an elongated frame 10 having a base member 11, end plate members 12, 13, and side channels 14, 15 connected between the end plate members. A carriage 16 is mounted on ways 17 in the base for longitudinal movement along the frame. The carriage has four parallel rolls extending across the carriage, two upper rolls 18, 19 and two lower rolls 21, 22. The upper rolls 18, 19 have axially extending grooves 20 extending the entire length of the rolls.

An elongated flexible band, or belt 25, which may, for example, be made of leather, fabric, wire mesh, thin stainless steel, or other flexible material, has one end connected to the top of end plate 12 and the other end connected to the top of end plate 13. The band, which is longer than the frame, passes over the upper rolls in the carriage and under the lower rolls thereof to define a loop 26 at the carriage. The upper rolls are closely spaced together to define a narrow throat 26a in loop 26 but the lower rolls are spaced a greater distance apart to define a broad base 26b to the loop.

The carriage 16, which is T shaped as shown in FIG. 6, has a way 27 extending along the stem of the T and into the base of the loop 26 defined by the band 25. A tool slide 28 is slidably received on the way 27 for cross movement relative to the frame. The tool slide has an upstanding column 29 with an overarm 30 extending over the throat of loop 26. A reciprocating blade 31, passing through throat 26a, extends between the over-arm 30 and a blade reciprocating motor 32 mounted on the tool slide. The blade 31, which is a thin, slightly barbed, wire capable of cutting in any direction, requires support at both ends as shown.

Longitudinal movement of the carriage 16 on the frame 10 is effected by motor 33 mounted in the carriage. As shown best in FIG. 3, motor 33 rotates a shaft 34 through gears 35a, 35b. Shaft 34, at each end, carries a gear 36, 37 which mesh, respectively, with racks 38, 39 connected to the bottom of the frame side channels. Control of motor 33 (by means not shown) controls movement of the carriage on the frame. Cross movement of the tool slide 28 on the carriage is effected by motor 45 mounted on the tool slide. A gear 46 carried by the shaft of motor 45 meshes with a rack 47 on way 27 of the carriage. Control of motor 45 (by means not shown) controls movement of the tool slide on the carriage.

A piece of flexible work 48, such as a plurality of layers of cloth (which may be as long as the frame 10) is placed on the band 25, which defines a table top for the work, for a cutting operation by the tool, or blade, 31. The work is not threaded through the rolls as the band is but, instead, spans the throat 26a. A pair of shelves 49a, 49b are connected to the carriage, one on each side of blade 31, to support the work as it passes across the rolls 18, 19 for cutting by the blade.

Oftentimes, in a machine of this type, the weight per lineal foot of the work and the length of the work results in a heavy load on the band which, unless supported, will sag, stretch, and/or tear. The support of the band, however, is difficult because as the carriage 16 travels along the frame 10, and the band 25 passes around the upper rolls 18, 19, there can be no interference by support members. In the embodiment of the invention illustrated, rails 50, 51 are secured, on each side of the band 25, to the top of side channels 14, 15, respectively. A slot 52 in the inner side of each rail extends the length of the rails.

A plurality of support bars 53 provide firm support for the band and any work load thereon. As shown best in FIG. 3 each support bar 53 has a blind bore 54 on each side. A flexible cable 55, 56 is received in the inner end of each bore and tightly secured therein by spacer 57 and threaded plug 58. Thus, the bars 53 and spaced apart cables 55, 56 define a flexible string of parallel, spaced apart, rigid bars. The cables are approximately the same length as the flexible band 25 and, like the band, are connected, at one end, to the top of end plate 12 and connected, at the opposite end, to the top of end plate 13. The string of support bars, like the band 25, passes over the upper rolls 18, 19 and under the lower rolls 21, 22. The string of bars is under the flexible band when the band is horizontal so the string of bars is inside the band at the upper rolls and outside the band at the lower rolls. The grooves 20 are provided in the periphery of the upper rolls to accommodate the spaced bars.

Each bore 54 has a plunger 60 slidably received therein, outboard of the threaded plug 58. Each plunger 60 has a pin 61 extending downwardly therefrom and through a longitudinal slot 62 in the bar. As shown best in FIGS. 3 and 5, the carriage has four cams 63 mounted thereon, two on one side of the carriage and two on the opposite side thereof. Each cam has a cam slot 64 which slopes outwardly as it extends from the carriage and which is positioned to receive pin 61 as the carriage approaches each bar 53. The plungers 60 define latches which, when extended, engage side rails 50, 51 to provide rigid support for the band 25 and the load of work 48 carried thereby. The cams 63 define actuators which receive pin 61 to urge the pin 61 and plunger 60 inwardly (thereby releasing the latches and disengaging the support bars from the side rails) as the carriage approaches a bar and which receive pin 61 to urge the pin 61 and plunger 60 outwardly (thereby reengaging the support bars with the side rails) as the carriage leaves each bar.

With longitudinal drive from motor 33 and cross drive from motor 45, the motors can be controlled to produce relative movement between cutting tool 31 and work material 48 in any desired direction. The motors may be controlled by any suitable means, such as a punched or magnetic tape of a numerical control system. As the carriage moves longitudinally during cutting, each bar 53 is released, one at a time, from the side rails by the unlatching actuators (defined by cams 63) on the front end of the carriage (that is, the end facing the instantaneous direction of movement). The string of bars which are released one at a time follow the band through the rolls of the carriage (passing inside the band at the upper rolls and outside the band at the lower rolls). As each bar of the string leaves the last roll (roll 18 if the carriage is moving to the right as viewed in FIG. 1 or roll 19 if the carriage is moving to the left as viewed in FIG. 1), the latch pins 61 of the bar move into the cam slots 64 of cams 63. As the bar moves away from the carriage, the latches move outwardly for reengagement with the rails.

It will be noted that with the construction disclosed herein, relative movement between the cutter 31 and the work 48 can be effected along the entire length of the work even if the table is no longer than the work. In other words, providing for longitudinal movement of the cutting tool (and carriage) instead of longitudinal movement of the work produces the advantage of a table which need be only as long as the work. However, since the tool carriage moves longitudinally relative to the work, stationary supports for the flexible table top cannot be used because of interference. This latter problem has been solved in the present invention by the movable support bars described herein.

What is claimed is:
1. A table comprising in combination:
 (a) a frame,
 (b) a flexible band carried by the frame,
 (c) a plurality of support bars operable to engage the frame and support the flexible band,
 (d) a carriage mounted on the frame for movement along the frame, at least a portion of the carriage extending below the band,
 (e) and means on the carriage to disengage the bars from and reengage the bars with the frame as the carriage passes.

2. A machine for an operation on work comprising:
 (a) a frame,
 (b) a carriage mounted on the frame for movement along the frame, said carriage having a plurality of rolls mounted thereon,
 (c) a flexible band carried by the frame and threaded through the rolls on the carriage to define a loop at the carriage,
 (d) a string of parallel support bars for the flexible band each having means to engage the frame, the bars on one side of the carriage disengaged from the frame one at a time as the carriage passes, said disengaged bars reengaged with the frame one at a time on the opposite side of the carriage after the carriage has passed, and
 (e) a tool carried by the carriage to operate on work which is supported by the flexible band and which spans the loop at the carriage.

3. A machine for an operation on work comprising:
 (a) a frame,
 (b) a carriage mounted on the frame for movement along the frame, said carriage having a plurality of rolls mounted thereon,
 (c) a flexible band carried by the frame and threaded through the rolls on the carriage to define a loop at the carriage,
 (d) a plurality of parallel support bars for the flexible band each having a latch at both ends to engage the frame, said latches operated by the carriage during movement of the carriage along the frame to disengage the bars in front of the carriage one at a time, said latches operated by the carriage to reengage said bars behind the carriage after the carriage has passed, and
 (e) a tool carried by the carriage to operate on work which is supported by the flexible band and which spans the loop at the carriage.

4. A machine for an operation on work comprising:
 (a) an elongated frame having support rails on each side,
 (b) a carriage mounted on the frame for movement along the frame, said carriage having a plurality of rolls mounted thereon,
 (c) a flexible band carried by and extending along the frame, said band threaded through the rolls on the carriage to define a loop at the carriage,
 (d) a plurality of parallel bars extending across the frame under the band, each bar having a latch at each end to engage the side rails,
 (e) a flexible cord connecting the bars together to form a flexible string of support bars, said string threaded through the rolls on the carriage to define a loop at the carriage,
 (f) means on the carriage to operate said latches to disengage the bars from the rails and reengage the bars with the rails, and
 (g) a tool carried by the carriage to operate on work which is supported by the flexible band and which spans the loop in the band at the carriage.

5. A machine for an operation on work comprising:
(a) an elongated frame having support rails on each side,
(b) a carriage mounted on the frame for movement along the frame, said carriage having a pair of upper rolls and at least one lower roll thereon, said upper rolls having grooves therein,
(c) a flexible band carried by and extending along the frame, said band passing over the upper rolls and under the lower roll to define a loop at the carriage,
(d) a plurality of parallel bars extending across the frame under the band, each bar having a latch at each end to engage the side rails,
(e) a pair of spaced apart flexible cords secured to the bars together to form a flexible string of support bars, said string of bars received in the grooves in the upper rolls and passing under the lower roll to define a loop at the carriage,
(f) an actuator on the carriage to operate the latches and disengage the bars from the side rails as the carriage approaches the bars and an actuator on the carriage to operate the latches and reengage the bars with the side rails as the carriage leaves the bars, and
(g) a tool carried by the carriage to operate on work which is supported by the flexible band and which spans the two upper rolls at the carriage.

6. A machine for an operation on work comprising:
(a) an elongated frame having support rails on each side,
(b) a carriage mounted on the frame for movement along the frame, said carriage having a pair of upper rolls and at least one lower roll thereon, said upper rolls having grooves therein,
(c) a flexible band carried by and extending along the frame, said band passing over the upper rolls and under the lower roll to define a loop at the carriage,
(d) a plurality of parallel bars extending across the frame under the band, each bar having a latch at each end to engage the side rails, each latch having a pin extending therefrom,
(e) a pair of spaced apar flexible cords secured to the frame and connecting the bars together to form a flexible string of support bars, said string of bars received in the grooves in the upper rolls and passing under the lower roll to define a loop at the carriage,
(f) two cams on the carriage to engage the pins respectively of the latches at opposite ends of each bar to retract the latches thereof from engagement with the side rails as the carriage approaches each bar and two cams on the carriage to engage the pins respectively of the latches at opposite ends of each bar to extend the latches thereof into engagement with the side rails as the carriage leaves each bar.

7. A machine for an operation on work comprising:
(a) a frame,
(b) a carriage mounted on the frame for movement along the frame,
(c) a flexible band carried by the frame and defining a loop at the carriage,
(d) a plurality of support bars for the flexible band each having means to engage the frame, the bars on one side of the carriage disengaged from the frame as the carriage passes, said disengaged bars reengaged with the frame on the opposite side of the carriage after the carriage has passed, and
(e) a tool carried by the carriage to operate on work which is supported by the flexible band and which spans the loop at the carriage.

References Cited by the Examiner
UNITED STATES PATENTS

| | | | |
|---|---|---|---|
| 527,723 | 10/1894 | Sargent | 198—193 |
| 2,320,652 | 6/1943 | Preston | 83—329 X |
| 2,682,307 | 6/1954 | Overman | 83—318 |
| 2,973,678 | 3/1961 | Scott et al. | 83—155 X |
| 3,072,004 | 1/1963 | Jenkins | 83—318 |

WILLIAM W. DYER, JR., *Primary Examiner.*

J. M. MEISTER, *Assistant Examiner.*